June 9, 1964     H. B. POSMANTER     3,136,491

PEPPER GRINDER

Filed June 7, 1961

INVENTOR.
HERMAN B. POSMANTER
BY
Gardner + Zimmerman
ATTORNEYS

United States Patent Office

3,136,491
Patented June 9, 1964

3,136,491
PEPPER GRINDER
Herman B. Posmanter, 5 Downey Place, Oakland, Calif.
Filed June 7, 1961, Ser. No. 115,491
4 Claims. (Cl. 241—168)

This invention relates to devices for grinding pepper and other spices directly upon food, and is particularly directed to a pepper grinding and dispensing device for formal dinner service.

Pepper mills and the like have long been employed to facilitate the grinding of pepper corns directly upon food such that the highly aromatic flavor peculiar only to pepper which is freshly ground is preserved in seasoning the food. Heretofore, however, pepper mills have been somewhat rustic in appearance and not particularly compatible with formal table settings. More specifically, they have generally comprised a cylindrical barrel, usually of wood, with a grinding mill in the lower end connected by an axially extending shank to a crank or other mill operating mechanism at the upper end. Such a wooden barrel of course detracts from the over-all appearance of a formal table setting where for example silver or crystal salt and pepper shakers of a rather exquisite ornate nature would normally be fitting. In addition, with conventional bottom dispensing pepper mills there is always some pepper residue that spills out on the table after each use such that a clean table appearance is difficult to preserve.

It is therefore an object of the present invention to provide a pepper mill in the form of a cap of a pepper shaker.

Another object of the invention is the provision of a top dispensing pepper mill which is readily adapted in appearance to be compatible with a formal table setting.

It is a further object of the invention to provide a very compact pepper mill.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
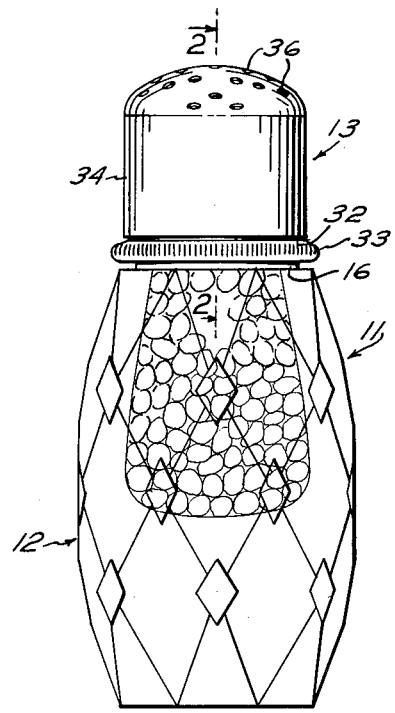
FIGURE 1 is an elevational view of the pepper mill of the present invention embodied as the cap of an ornate crystal pepper shaker.

Referring now to the drawing, FIGURE 1, in particular, there is shown a pepper dispensing device 11 including a pepper container 12 having a cap portion 13 secured to its upper end and housing the pepper mill of the present invention. It is particularly important to note that inasmuch as the mill is compactly built into the cap portion, such cap portion may be made to resemble that of a conventional formal pepper shaker and employed with a container of very ornate design, such as the crystal container illustrated. Hence, the present invention facilitates the provision of a pepper mill which may be readily designed compatible in appearance with formal table settings.

Figure 3:
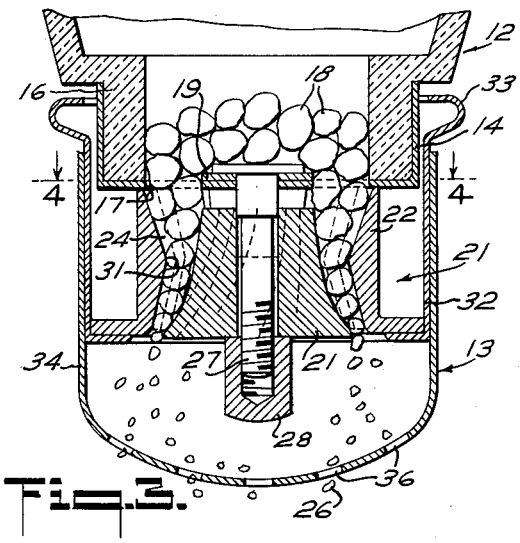
FIGURE 3 is a sectional view taken at line 3—3 of FIGURE 2 and depicting the device in inverted grinding and dispensing position.
Figure 4:
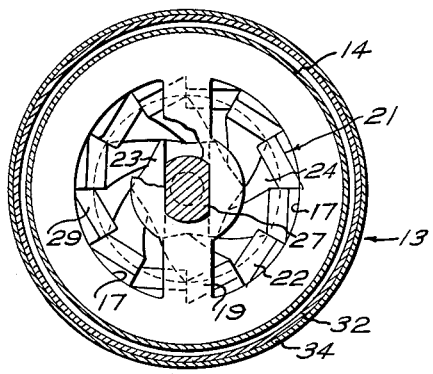
FIGURE 4 is a sectional view taken at line 4—4 of FIGURE 3.
Figure 2:
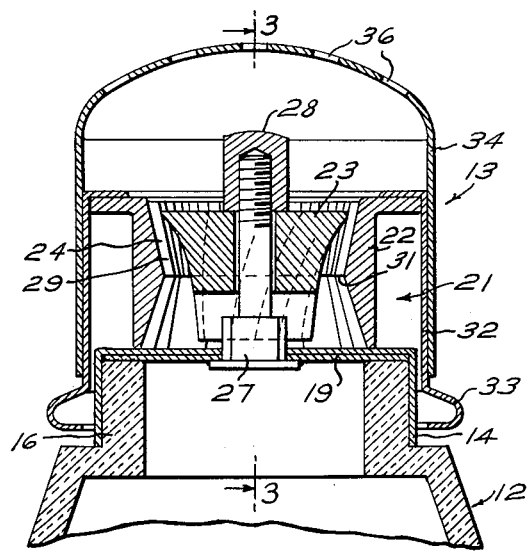
FIGURE 2 is a sectional view taken at line 2—2 of FIGURE 1.

The mill cap portion 13 includes a mounting element 14 of cupped configuration adapted for close fitting engagement with the neck 16 of the container 12. The mounting element is provided with openings 17, preferably of substantially semicircular configuration, in its end wall to permit the free passage of pepper corns 18 therethrough when the container is inverted as depicted in FIGURE 3. The mounting element further includes a medial bridge portion 19 interposed between the openings 17.

The mounting element 14 carries a rotary mill assembly 21 which is hand rotatable to grind the pepper corns introduced thereto through the openings 17 upon inversion of the container 12. The mill comprises concentric spaced outer and inner grinding elements 22, 23 mounted for relative rotation and defining an open ended annular grinding chamber 24 therebetween in communication with the mounting element openings 17. One of the grinding elements, for example, inner element 23, is fixedly attached to the mounting element 14 such that the container 12 and outer grinding element may be grasped in the users opposite hands and rotated relative to each other to produce a grinding action in the chamber 24. The pepper corns in the chamber are thus ground with the resulting pepper grains 26 being dispensed from the upper open end of the chamber.

Considering now the mill assembly in greater detail as to its preferred structure, the inner grinding element 23 is best provided as an upwardly diverging cylindrical solid of revolution. Such upwardly diverging cylindrical element is secured to the bridge portion 19 of mounting element 14 by means of a pin 27 extending upwardly from its center. Moreover the grinding element is slidable along the pin with its extent of travel being adjustably determined by a stop nut 28 threadably secured to the end of the pin. Thus the nut may be twisted to vary the displacement of the grinding element 23 from the mounting element when the container 12 is in inverted position, the grinding element sliding along the pin and being stopped upon abutting the nut. The feature facilitates adjustment of the coarseness of the ground pepper grains dispensed from the chamber in a manner subsequently described.

The outer grinding element 22 is preferably of a cylindrical configuration with a central passage defined by a plurality of circumferentially spaced radially inwardly projecting grinding blades 29. The passage defined by the blades has a central constriction 31 from which the blades diverge in opposite directions. In addition, the outer grinding element is outwardly flanged at its upper end and a skirt portion 32 depends therefrom and is concentrically disposed about the periphery of the mounting element 14 in rotatable spaced relation thereto. The skirt portion has an annular rib 33 at its lower end which is preferably knurled or otherwise roughened at its outer surface to provide a good finger grip. The passage defined by blades 29 is concentrically spaced from the inner grinding element 23 but the diameter of the latter at its upper diverging end is somewhat greater than the diameter of constriction 31. Moreover, the diverging end of the inner grinding element is disposed within the upper diverging portion of the passage defined by blades 29. Hence, the outer grinding element is limited in its longitudinal travel by the larger diameter of the upper end of the inner grinding element and is thus longitudinally retained while being rotatable relative thereto. Thus, upon holding the outer grinding element fixed as by grasping the rib 33 in one hand and rotating the inner grinding element as by rotating the container 12 with the other hand, a grinding action is produced within the chamber 24 between the respective grinding elements.

Figure 5:
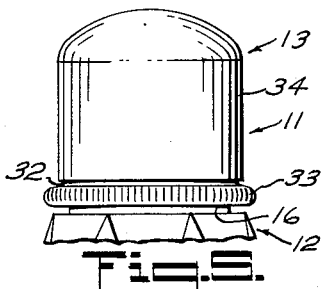
FIGURE 5 is an elevational view of a modified form of the pepper mill.

The grinding mill cap portion 13 of the pepper grinder and dispenser is completed by a cup-shaped cover 34, the peripheral portion of which concentrically engages the periphery of skirt portion 32 in the region thereof above the rib 33. The cover 34 may be provided with perforations 36 as depicted in the embodiment of FIGURES 1 to 4, or may be devoided of same, as depicted in the embodiment of FIGURE 5, in order to seal in the aroma of the pepper corns. In either case the grinding action is the same. Upon inverting the container 12, the pepper corns enter the grinding chamber 24 through the openings 17 in the mounting element. The holder is grasped in one hand and the rib 33 in the other, and such elements are rotated relative each other. The inner and outer grinding elements are thereby rotated relative to each other such that the pepper corns in the chamber are ground therebetween with the resulting pepper grains 26 falling freely from the open upper end of the chamber. Where the cover 34 is provided with the perforations 36, the grains pass therethrough. Where the cover 34 is imperforate as depicted in FIGURE 5, such cover must of course be removed prior to grinding and dispensing the pepper.

In the event the pepper grains are too fine or coarse, adjustment may be readily made by means of the nut 28. To obtain a finer grain size, the nut is tightened, thus forcing the inner grinding element 23 longitudinally of pin 27 into closer peripheral engagement with the outer grinding element 22. Conversely a coarser grain size is obtained by loosening the nut, the size of the upper opening of the grinding chamber 24 being correspondingly widened.

Refilling of the container 12 may be readily accomplished by removing the nut 28 to thus free the inner and outer grinding elements. These elements then slip off of the mounting element and pin to expose the openings 17 in the mounting element. A fresh supply of pepper corns may then be introduced to the container through the openings and the grinding mill elements reassembled.

What is claimed is:

1. A spice grinding device comprising a mounting element having openings therein adapted to retentively engage the neck of a spice container in closing relation thereto, and a grinding mill mounted upon said element and having spaced concentric inner and outer grinding elements rotatable relative to each other defining an open ended grinding chamber in communication with the openings of said mounting element, said inner element being mounted on said mounting element for free axial movement relative thereto within a predetermined increment of distance and restricted from rotational movement relative to said mounting element, one of said grinding elements having walls inclined at an angle to the axis of said mill whereby the radial spacing between said grinding elements is dependent on the relative axial position of the two grinding elements, and means for selectively varying said predetermined increment of movement.

2. In combination with a spice container having an open ended neck, a grinding and dispensing cap portion comprising a mounting element retentively secured to said neck and extending transversely of its end, said element having openings therethrough communicating with said open ended neck, a grinding mill including an inner cylindrical grinding element mounted upon said mounting element and restricted from rotation relative thereto and an outer cylindrical grinding element in concentric spaced relation to said inner grinding element and rotatable relative thereto, said inner and outer grinding elements defining an open ended grinding chamber therebetween in communication with the opening through said mounting element, said inner element being mounted on said mounting element for free axial movement relative thereto within a predetermined increment of distance and restricted from rotational movement relative to said mounting element, one of said grinding elements having walls inclined at an angle to the axis of said mill whereby the radial spacing between said grinding elements is dependent on the relative axial position of the two grinding elements, means for selectively varying said predetermined increment of movement, said outer element being freely movable axially and rotationally relative to said mounting element and having an end portion adapted for abutting engagement with said mounting element, and means limiting the extent of axial movement of said outer element away from said mounting element.

3. A pepper grinding and dispensing device comprising a container having an open ended neck, a cup-shaped mounting element concentrically secured to said neck and having openings through its end wall, a pin fixedly secured to said mounting element and projecting coaxially upward therefrom, a generally cylindrical inner grinding element mounted upon said pin and freely coaxially movable thereon while being restricted from rotation relative thereto, said inner grinding element having an upwardly radially outwardly diverging end, a nut threadably secured to the end of said pin for adjusting the extent of axial movement of said inner element, a cylindrical outer grinding element having a central passage defined by radially inwardly projecting grinding blades, said outer grinding element concentrically disposed about said inner grinding element in spaced relation to said pin and being axially and rotationally movable relative to said pin and inner element, said passage diverging radially outwardly in opposite directions from a medial constriction, the diameter of said constriction being less than the diameter of said inner grinding element at its upper diverging end to provide for axial retention of said outer element relative to said mounting element while allowing rotation of said outer element relative to said inner element, said upper diverging end of the inner grinding element being disposed within the upper diverging portion of said passage, said inner and outer grinding elements defining an open ended grinding chamber communicating with said openings in said mounting element, a cylindrical skirt peripherally depending from the upper end of said outer grinding element and encompassing the neck of said container, said skirt having an annular rib about its lower end, and a cup-shaped cover removably concentrically engaging the upper end of said skirt.

4. A device of the character described comprising, a mounting element, an inner grinding element mounted on said mounting element in rotationally fixed relation thereto, said grinding element having an outer wall surface diverging radially outwardly away from said mounting element, an outer grinding element having a central passage disposed concentrically about said inner element in generally spaced relation thereto and adapted for longitudinal and rotational movement relative to said inner element, said passage having a region diverging radially outwardly away from said mounting element, said outer element having smaller diameter at one point in said passage than the largest diameter of said inner element whereby said outer element is limited in its axial movement away from said mounting element, and said outer element having an end portion adapted for abutting engagement with said mounting element to limit axial movement of said outer element towards said mounting element.

References Cited in the file of this patent

UNITED STATES PATENTS 2,507,670    Jatkoe et al. _____ May 16, 1950